United States Patent Office 3,676,163
Patented July 11, 1972

---

3,676,163
REFRACTORY, FIRED MAGNESIA BRICK
Günther Lorenz Mörtl, Villach, Austria, assignor to Oesterreichisch-Amerikanische Magnesit A.G.
No Drawing. Filed Aug. 20, 1970, Ser. No. 65,701
Claims priority, application Austria, Aug. 25, 1969,
A 8,117/69
Int. Cl. C04b 35/04
U.S. Cl. 106—58                    11 Claims

ABSTRACT OF THE DISCLOSURE

Refractory magnesia brick fired at standard temperatures of about 1650° C., containing at least 90% MgO, less than 1% $Fe_2O_3$, and having a lime-silica ratio (C/S) of 1.65 to 2.50, said brick being formed from over 50% coarse-grained magnesia having a particle size of at least 0.3 mm. and a C/S of at least 1.0, and less than 50% fine-grained magnesia having a particle size of at most 0.3 mm., at least 2% fine-grained magnesia with a C/S of less than 1.0 being present, and a finely ground lime-carrier, and said brick having a bonding phase containing dicalcium silicate formed in situ in the brick by reaction of said fine-grained magnesia with said finely ground lime-carrier.

---

The invention relates to a refractory fired magnesia brick, which contains at least 90% MgO and less than 1% $Fe_2O_3$ and has a lime-silica ratio (weight ratio) of 1.65 to 2.50, suitably about 1.87, and to processes of making the same.

Low-iron magnesia bricks having a lime-silica ratio of and above 1.65 must generally be fired at temperatures of at least 1750° C. to ensure the formation of a good ceramic bond. Firing at such high temperatures is not only economically unfavorable, but is undesirable for the brick manufacturer also because normal firing kilns cannot be used for this purpose, so that a special firing kiln which permits of firing at temperatures which are higher than the usual temperatures of about 1650° C. must be operated also for producing relatively low amounts of bricks. According to an earlier proposal these disadvantages can be avoided in the manufacture of refractory, fired magnesia bricks containing less than 1%, preferably less than 0.5%, $Fe_2O_3$ and having a lime-silica ratio (weight ratio) of 1.65 to 2.50, preferably about 1.87, and composed of more than 50% coarse-grained magnesia having a particle size of at least 0.3 mm. and less than 50% fine-grained magnesia having a particle size of at most 0.2 mm., if only coarse-grained magnesia having a lime-silica ratio of 1.87 to 5.0 is used and at least 2% fine-grained magnesia having a lime-silica ratio below 1.0 are added to that coarse-grained magnesia. By this process, high-grade fired magnesia bricks can be obtained at normal firing temperatures up to about 1650° C.

However, further investigations have shown that with particularly high-grade magnesia compositions, i.e. compositions which contain less than 1% and preferably less than 0.5% $Fe_2O_3$ and more than 97% MgO, e.g., 98% MgO, desirable results cannot be obtained, even when said proposal is followed. Although these magnesia compositions have in most cases lower lime-silica ratios (C/S) of below 1.65, they cannot be used to make bricks having properties which are satisfactory in every respect, whether usual processes are employed or the above-mentioned proposal is followed. This is apparent from the experiment which will be described hereinafter and in which a sea-water magnesia (sintered magnesia I) of the following composition was used:

| | Percent |
|---|---|
| $SiO_2$ | 0.56 |
| CaO | 0.92 |
| $Fe_2O_3$ | 0.19 |
| $Al_2O_3$ | 0.21 |
| $Cr_2O_3$ | 0.48 |
| MgO | 97.29 |
| Ignition loss | 0.35 |

Lime-silica ratio, 1.64.

This sintered magnesia was used in the following particle size distribution in forming the brick mixture:

| | Particle size in mm. |
|---|---|
| 25% | 2 to 4. |
| 42% | 0.3 to 2. |
| 33% | Below 0.12. |

A mixture containing these particle size fractions as well as 1% dry cell pitch (evaporation residue of sulfite cellulose waste liquor) and 2.1 liters of water per 100 kp. of the brick mixture were shaped into bricks under a pressure of 1000 kp./cm.² The bricks were dried and fired at 1630° C. and then exhibited the following properties:

| | |
|---|---|
| Bulk specific gravity | g./cm.³ 2.89 |
| Porosity | percent 15 |
| Cold-crushing strength (CCS) | kp./cm.² 316 |
| Hot-bending strength (HBS): | |
| At 1260° C. | kp./cm.² 74 |
| At 1480° C. | kp./cm.² 31 |

An addition of 2% fine-grained magnesia having a particle size of 0 to 0.2 mm. and a lime-silica ratio below 1.0 to the brick mixture will result in bricks having a lower hot-bending strength and a lower refractoriness-under-load, whereas the other parameters tested will not be appreciably improved.

It has now been found that in magnesia compositions containing more than 95% magnesia the hot-bending strength will increase with an increase of the content of dicalcium silicate. Nevertheless, an addition of lime-containing substances to the above-mentioned brick mixture will not increase the strength of the bricks obtained therefrom but will result in a lowering of these parameters, particularly of the cold-crushing strength.

It has been found, however, that by a simultaneous use of at least 2% fine-grained magnesia having a lime-silica ratio of below 1.0 and a finely ground lime-containing material in an amount which is sufficient to provide a lime-silica ratio of 1.65 to 2.50 in the brick mixture, the properties of the fired bricks may be much improved, even if a coarse-grained magnesia having a lime-silica ratio as low as 1.0 is used. At the temperatures at which the bricks are fired, this fine-grained magnesia reacts with the lime-containing substances to form particularly dicalcium silicate, so that the brick then includes a bonding phase which contains dicalcium silicate formed in situ. Thus the invention relates to a refractory, fired magnesia brick, which contains at least 90%, preferably 94 to 96%, MgO and less than 1% and preferably less than 0.5% $Fe_2O_3$, has a lime-silica ratio (weight ratio) of 1.65 to 2.50, suitably about 1.87, and is composed of more than 50% coarse-grained magnesia having a particle size of at least 0.3 mm. and less than 50% fine-grained magnesia having a particle size of at most 0.3 mm., preferably at most 0.2 mm., the coarse-grained magnesia and the entire fine-grained magnesia containing less than 1%, preferably less than 0.5%, $Fe_2O_3$, and at least 2% fine-grained magnesia having a lime-silica ratio below 1.0 being present. In this brick the coarse-grained magnesia consists exclusively of magnesia having a lime-silica ratio of at least 1.0, preferably at least 1.5, and the brick includes a bonding phase which contains dicalcium silicate formed in situ by a reaction of the fine-grained magnesia with a finely ground lime-carrier, i.e. a lime-containing substance.

If the brick contains boron compounds, their content, calculated as $B_2O_3$, must not exceed 0.15%, preferably 0.10%.

In order to obtain best results, the coarse-grained magnesia should contain at least 94% and preferably 96% MgO. The lime-containing substance may consist of virtually any material which has a low silica content and a high lime content and which in addition to any MgO which may be present contains only small amounts of other substances. For this reason, particularly desirable lime-containing substances are calcite or chalk, calcium hydroxide, dolomite or mixtures thereof. The lime-containing substance is generally introduced in such amounts into the brick mixture to be pressed that the lime-containing substance is present in the unfired brick mixture in an amount which corresponds to at least 0.25% CaO, related to the brick weight. The lime-containing substance must be finely ground, i.e. its particle size should not exceed 0.2 mm. and preferably 0.12 mm.

As a limit, the entire fine-grained magnesia may have a lime-silica ratio below 1.0. In most cases, however, this fine-grained fraction is used together with a fine-grained fraction having the same lime-silica ratio as the coarse-grained magnesia. Thus different kinds of coarse-grained and/or fine-grained magnesia may be used at the same time, provided that the stated requirements as to the lime-silica ratio are met.

The fine-grained magnesia is generally used in an amount of 20 to 40%, preferably 25 to 35%. If a coarse-grained magnesia is used which has a lime-silica ratio of 3.0 and more, it is preferable to use a non-aqueous binder, such as tar, pitch or bitumen, or to press the brick mixtures to form bricks in a dry state without a binder.

The bricks according to the invention should suitably contain at most 97% of MgO. The bricks may be impregnated, if desired, with tar, pitch, bitumen or mixtures thereof and the impregnated bricks may be baked in a non-oxidizing atmosphere at a temperature of 300 to 1000° C.

The bricks according to the invention are made in a simple manner in that the coarse-grained magnesia, the fine-grained magnesia, any binder which is used, and the finely ground lime-containing substance are mixed in such amounts that the lime-containing substance is present in an amount corresponding to at least 0.25% CaO, related to the dry brick mixture, and the mixture is then shaped into bricks, which are dried and fired. Any impregnation of the fired bricks with tar, pitch, bitumen or mixtures of these substances is preferably carried out under use of a vacuum.

The bricks according to the invention are highly suitable for lining oxygen-blowing converters, particularly LD-converters, and for a use in the upper hot layers of regenerator checkers, particularly in regenerators used in the glass industry. Particularly good durabilities in LD-converters will be obtained with the impregnated bricks, whether or not the same have been baked as has been stated.

The invention will be explained more fully with reference to the following examples. It must be pointed out, however, that the sintered magnesia used in these examples, which may be a synthetic or natural magnesia, may be replaced by fused magnesia. All percentages in these examples and throughout the specification and claims are given by weight, excepted the porosity values, which are quoted in usual manner as percentages by volume.

EXAMPLE 1

A brick mixture was made using a sintered magnesia I having the composition stated above and a sintered magnesia II having the following composition:

| | Percent |
|---|---|
| $SiO_2$ | 3.6 |
| CaO | 1.4 |
| $Fe_2O_3$ | 0.1 |
| $Al_2O_3$ | 0.1 |
| MgO | 94.6 |
| Ignition loss | 0.2 |

Lime-silica ratio, 0.39.

The brick mixture was composed as follows:

| | Particle size in mm. |
|---|---|
| 25% sintered magnesia I | 2 to 4. |
| 42% sintered magnesia I | 0.3 to 2. |
| 27% sintered magnesia I | Below 0.12. |
| 5% sintered magnesia II | Do. |
| 1% chalk | Do. |

1% dry sulfite cellulose waste liquor.
2.1 liters water per 100 kp. of brick mixture.

The added chalk consisted of practically pure calcium carbonate. Under a pressure of 1000 kp./cm.², this brick mixture was pressed into bricks, which were dried and fired at a temperature of 1630° C. The resulting bricks had the following properties (mean values based on tests with ten bricks):

| | | |
|---|---|---|
| Bulk specific gravity | g./cm.³ | 2.92 |
| Porosity | percent | 15.0 |
| CCS | kp./cm.² | 426 |
| HBS: | | |
| 1260° C. | kp./cm.² | 104 |
| 1480° C. | kp./cm.² | 73 |

The bricks had the following chemical composition:

| | Percent |
|---|---|
| $SiO_2$ | 0.71 |
| CaO | 1.51 |
| $Fe_2O_3$ | 0.18 |
| $Al_2O_3$ | 0.20 |
| $Cr_2O_3$ | 0.45 |
| MgO | 96.95 |

Lime-silica ratio, 2.13.

The results show that the invention enables the processing of sea-water magnesia into bricks which have tested parameters and mineralogical characteristics that are just as good as those of bricks made of natural magnesites.

EXAMPLE 2

A sea-water magnesia III composed of

| | Percent |
|---|---|
| $SiO_2$ | 0.80 |
| CaO | 1.55 |
| $Fe_2O_3$ | 0.25 |
| $Al_2O_3$ | 0.23 |
| $Cr_2O_3$ | 0.44 |
| MgO | 96.29 |
| Ignition loss | 0.44 |

Lime-silica ratio, 1.93.

was used together with the sintered magnesia II of Example 1 to prepare the brick mixture defined below:

| | Particle size in mm. |
|---|---|
| 25% sintered magnesia III | 2 to 4. |
| 42% sintered magnesia III | 0.3 to 2. |
| 15% sintered magnesia III | Below 0.12. |
| 16.5% sintered magnesia II | Do. |
| 1.5% chalk | Do. |

2.5 liters kieserite solution.
(28° Bé) per 100 kp. brick mixture.

Bricks made of this brick mixture in the manner described in Example 1 had the following properties:

Bulk specific gravity _____g./cm.$^3$__ 2.92
Porosity _____percent__ 16.2
CCS _____kp./cm.$^2$__ 420
HBS:
   1260° C. _____kp./cm.$^2$__ 151
   1480° C. _____kp./cm.$^2$__ 80

The chemical composition of the bricks was as follows:

| | Percent |
|---|---|
| $SiO_2$ | 1.3 |
| CaO | 2.4 |
| $Fe_2O_3$ | 0.2 |
| $Al_2O_3$ | 0.2 |
| $Cr_2O_3$ | 0.4 |
| MgO | 95.4 |
| Ignition loss | 0.1 |

Lime-silica ratio, 1.85.

EXAMPLE 3

If in the bricks described in Example 2 the lime-silica ratios are changed to be below 1.65 and above 2.50, the values of the cold-crushing strength and hot-bending-strength will be reduced, as is apparent from the following table:

| | | |
|---|---|---|
| Lime-silica ratio | 1.59 | 2.61 |
| CCS, kp./cm.$^2$ | 380 | 310 |
| HBS, kp./cm.$^2$ at— | | |
| 1,260° C | 102 | 68 |
| 1,480° C | 27 | 62 |

What is claimed is:

1. Fire resistant calcined magnesite brick containing a minimum of 90% MgO and a maximum of 97% MgO and less than 1% $Fe_2O_3$ having a lime-silicic acid ratio (C/S) (by weight) of 1.65 to 2.50 and being formed from a base mixture consisting essentially of over 50% coarse grain magnesia of at least .3 mm. size having a C/S of at least 1.0, at least 2% fine grain magnesia having a grain size less than 3 mm. and a C/S less than 1.0, and a finely ground lime bearer, said brick being characterized by having in situ bonding containing dicalcium silicate formed from said fine grain magnesia and lime bearer.

2. Refractory, fired magnesia brick according to claim 1, wherein the lime-carrier is a member selected from the group consisting of calcite, chalk, calcium hydroxide, dolomite and mixtures thereof.

3. Refractory, fired magnesia brick according to claim 1, wherein the lime-carrier is present in the brick before firing in an amount, based on the weight of the brick, providing at least 0.25% CaO.

4. Refractory, fired magnesia brick according to claim 1, wherein the brick is impregnated with a member selected from the group consisting of tar, pitch, bitumen and mixtures thereof.

5. Refractory, fired magnesia brick according to claim 4, wherein the impregnated brick is tempered at a temperature of 300 to 1000° C. in a non-oxidizing atmosphere.

6. Refractory, fired magnesia brick in accordance with claim 1, wherein the brick contains 94 to 96% MgO, less than 0.5% $Fe_2O_3$, and has a C/S of about 1.87; the base mixture fine-grained magnesia being at most 0.2 mm., both the fine and coarse-grained magnesia containing less than 0.5% $Fe_2O_3$, the coarse-grained magnesia having a C/S of at least 1.5, and the lime-carrier being present in an amount providing at least 0.25% CaO, based on the weight of the brick before firing.

7. Refractory, fired magnesia brick according to claim 6, wherein the lime-carrier is a member selected from the group consisting of calcite, chalk, calcium hydroxide, dolomite and mixtures thereof.

8. A process for the production of fire resistant magnesite brick containing a minimum of 90% MgO and a maximum of 97% MgO and less than 1% $Fe_2O_3$ having a lime-silicic acid ratio (C/S) (by weight) of 1.65 to 2.50 comprising compressing a base mixture consisting essentially of over 50% coarse grain magnesia of at least .3 mm. grain size having a C/S of at least 1.0, at least 2% fine grain magnesia having a grain size less than 3 mm. and a C/S less than 1.0 and a finely ground lime bearer into brick form and calcining said mix at a temperature up to about 1650° C.

9. The process of claim 8, wherein after firing the brick is impregnated with a member selected from the group consisting of tar, pitch, bitumen and mixtures thereof and tempered at a temperature of 300 to 1000° C. in a non-oxidizing atmosphere.

10. The process for the production of refractory fired brick in accordance with claim 8, wherein the brick contains 95 to 96% MgO, less than 0.5% $Fe_2O_3$ and has a C/S of about 1.87; the base mixture fine-grained magnesia being at most 0.2 mm., both the fine and coarse-grained magnesia containing less than 0.5% $Fe_2O_3$, the coarse grain material having a C/S of at least 1.5 and the lime-carrier being present in an amount providing at least 0.25% CaO, based on the weight of the brick before firing.

11. The process according to claim 10, wherein the lime-carrier is a member selected from the group consisting of calcite, chalk, calcium hydroxide, dolomite, and mixtures thereof.

References Cited
UNITED STATES PATENTS
3,378,383    4/1968    Van Dreser _____ 106—58

FOREIGN PATENTS
1,815,438    7/1969    Germany _____ 106—58

JAMES E. POER, Primary Examiner

U.S. Cl. X.R.

106—63